(12) United States Patent
Takahashi et al.

(10) Patent No.: US 7,378,612 B2
(45) Date of Patent: May 27, 2008

(54) ARC WELDING ROBOT

(75) Inventors: Wataru Takahashi, Osaka (JP);
Yasushi Mukai, Osaka (JP); Kazunori Matsumoto, Ibaraki (JP); Toshiyuki Mishima, Neyagawa (JP); Takashi Nagai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/566,832

(22) PCT Filed: May 23, 2005

(86) PCT No.: PCT/JP2005/009368

§ 371 (c)(1),
(2), (4) Date: Feb. 1, 2006

(87) PCT Pub. No.: WO2006/001145

PCT Pub. Date: Jan. 5, 2006

(65) Prior Publication Data

US 2006/0278621 A1 Dec. 14, 2006

(30) Foreign Application Priority Data

Jun. 23, 2004 (JP) ............................. 2004-184734

(51) Int. Cl.
*B23K 9/12* (2006.01)
(52) U.S. Cl. .................. 219/125.1; 219/137.9; 901/42
(58) Field of Classification Search ............ 219/125.1, 219/137.9; 901/42
See application file for complete search history.

(56) References Cited

U.S. PATENT DOCUMENTS

| | | | | |
|---|---|---|---|---|
| 6,107,601 | A | * | 8/2000 | Shimogama ............ 219/130.01 |
| 6,555,786 | B2 | * | 4/2003 | Sasano ................... 219/137.71 |
| 6,750,428 | B2 | * | 6/2004 | Okamoto et al. ........ 219/130.5 |
| 7,105,771 | B2 | * | 9/2006 | Inoue et al. .............. 219/125.1 |

FOREIGN PATENT DOCUMENTS

| | | | |
|---|---|---|---|
| EP | 0 386 791 A2 | * | 9/1990 |
| JP | 60-157078 U | | 10/1985 |
| JP | 2003-285167 | * | 10/2003 |
| JP | 2003-285167 A | * | 10/2003 |
| JP | 2004-223576 | | 8/2004 |
| JP | 2004-223576 A | * | 8/2004 |
| WO | 02090034 | | 11/2002 |

OTHER PUBLICATIONS

Takuji Hayashi, "Development of Robot Equipped with Full Digital Welding Power Supply", "Welding Engineering" Japan Welding Engineering Society, vol. 51, No. 1, p. 72, 2003.

* cited by examiner

*Primary Examiner*—Kevin P Kerns
(74) *Attorney, Agent, or Firm*—Pearne & Gordon LLP

(57) ABSTRACT

Accommodating a welding control cable for connecting a welding power supply and a robot main body and a wire feeder sensor cable connected to a wire feeder encoder in a robot main body driving power cable connecting the robot main body and the robot controller of an arc welding robot. This configuration saves the number of cables to be connected thus improving the installation workability in system deployment on site as well as reducing the overall cost.

3 Claims, 5 Drawing Sheets

PRIOR ART

PRIOR ART

ARC WELDING ROBOT

TECHNICAL FIELD

The present invention relates to an arc welding robot.

BACKGROUND ART

In recent years, the importance of support for quality standards such as ISO has been increased and the need for high-quality welding is getting higher, a flexible welding system capable of supporting small lot multi-production required by diversified customer needs, e.g. in the automotive industries.

In order to assure the improvement of welding quality, a welding power supply capable of performing stable wide-range welding from a low current area to a high current area, which is from 30 A to 350 A, has been developed. A wire feeder equipped with an encoder is employed to increase the stability of welding in the low current area. A robot controller and a welding power supply are integrated to dramatically reduce the footprint. These efforts has provided speedy installation and system startup as well as flexible system deployment (for example, refer to Takuji Hayashi, "Development of Robot Equipped with Full Digital Welding Power Supply" disclosed in "Welding Engineering" (Japan Welding Engineering Society) Vol. 51, No. 1, page 72 (2003).

FIG. 3 shows a general configuration of a conventional arc-welding robot.

Referring to FIG. 3, a robot main body 101 connects to a robot controller 102 via a robot drive power cable 102a for driving the robot and a robot control cable 102b for position control of the robot.

The robot controller 102 connects to a welding power supply 103 via an interface cable (not shown). The robot controller 102 and the welding power supply 103 are connected in a housing to form an integral shape.

To the robot main body 102 are attached a welding torch 104 and a wire feeder 105 for feeding welding wire to the welding torch 104.

FIG. 4 is a detailed explanatory drawing of the vicinity of the wire feeder 105.

Between the robot main body 101 and the welding power supply 103 is connected a welding control cable 103a. Inside the welding control cable 103a are accommodated a power cable 105b for driving a wire feeder motor 105a and gas valve control cable 105d for a gas valve 105c and a power voltage feedback cable 105e.

Between the wire feeder 105 and the welding power supply 103 is connected a feeder sensor cable 103b for stabilizing the wire feed amount to a wire feeder encoder 105f in order to monitor the wire feed speed.

Gas required for welding is supplied from a gas bomb 106 to a welding torch 104 via a gas flow regulator 107, a gas hose 108, a hose (not shown) in the robot main body 101 as well as a gas hose 105g and a gas valve 105c.

DISCLOSURE OF THE INVENTION

[Problems that the Invention is to Solve]

However, with the related art configuration, for example in case a welding member substantially exceeding the operation range of the robot main body 101 is welded, it must be mounted on a shift device (not shown) for shifting the robot main body 101 leftward and rightward. As a result, the robot drive power cable 102a and the robot control cable 102b between the robot main body 101 and the robot controller 102 must be extended.

Moreover, the welding control cable 103a, the feeder sensor cable 103b and the gas hose 108 must be separately extended. This results in considerable man-hours and cost in flexible system deployment, thereby worsening the work quality on site.

In view of the related art problems, an object of the invention is to provide an arc-welding robot with improved workability on site.

[Means For Solving the Problems]

In order to attain the above object, the invention provides an arc welding robot comprising a robot main body including a welding torch, a wire feeder for feeding welding wire to the welding torch, the wire feeder including a sensor and a driving motor, a robot controller for controlling the robot main body, and a welding power supply arranged inside the robot controller, the welding power supply controlling the wire feeder and a welding power, wherein a robot main body driving power cable and a robot control cable are connected between the robot controller and the robot main body and wherein a sensor cable of the wire feeder, a gas valve control cable for a shield gas supplied to the welding torch and a welding voltage feedback cable are accommodated in the robot main body driving power cable.

Or, a sensor cable of the wire feeder, a gas valve control cable for a shield gas supplied to the welding torch and a welding voltage feedback cable are accommodated in the sensor cable.

In this way, by accommodating a welding control cable connecting a welding power supply and a robot main body and a wire feeder sensor cable connected to the wire feeder encoder in a robot main body driving power cable connecting the robot main body and the robot controller, it is possible to save the number of cables to be connected thus improving the installation workability in system deployment on site as well as reducing the overall cost.

The invention offers considerable advantages that a flexible system is implemented by using a robot driving power cable and a robot control cable between a robot main body and a robot controller and the installation work man-hours on site and the overall cost are reduced.

BEST MODE FOR CARRYING OUT THE INVENTION

Embodiment

An embodiment of the invention will be described referring to FIG. 1A and FIG. 2.

Figure 1A:
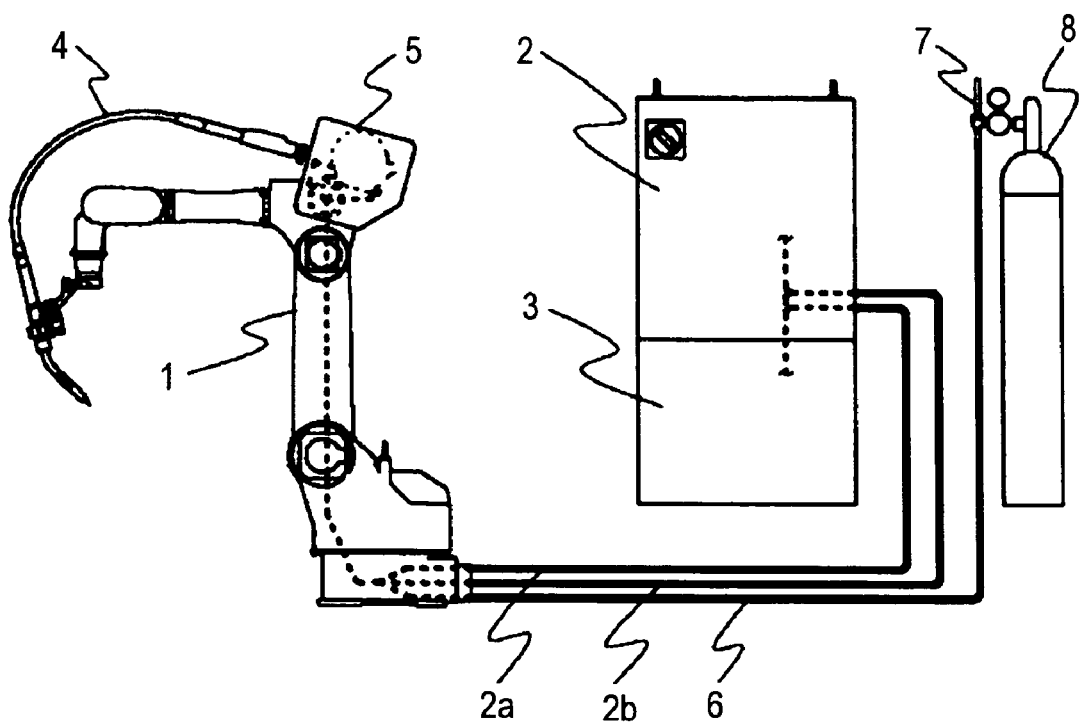
FIG. 1A shows a general configuration of an arc welding robot according to an embodiment of the invention.

In FIG. 1A, a numeral 1 represents a robot main body, 2 a robot controller, 2a a robot main body driving power cable, 2b a robot control cable, 3 a welding power supply, 4 a welding torch, 5 a wire feeder, 6 a gas hose, 7 a gas flow regulator, and 8 a gas bomb.

Figure 2:
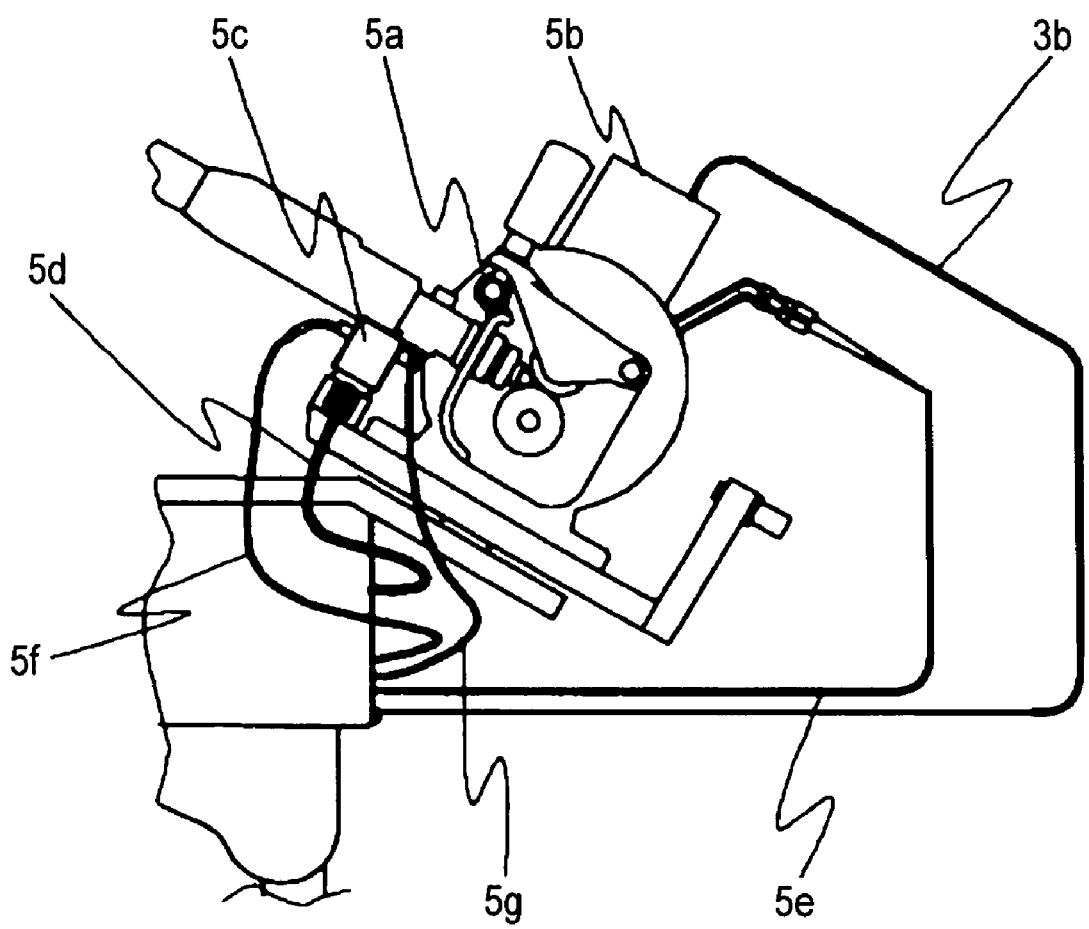
FIG. 2 is an explanatory drawing of the wire feeder of an arc welding robot according to an embodiment of the invention.
Figure 3:
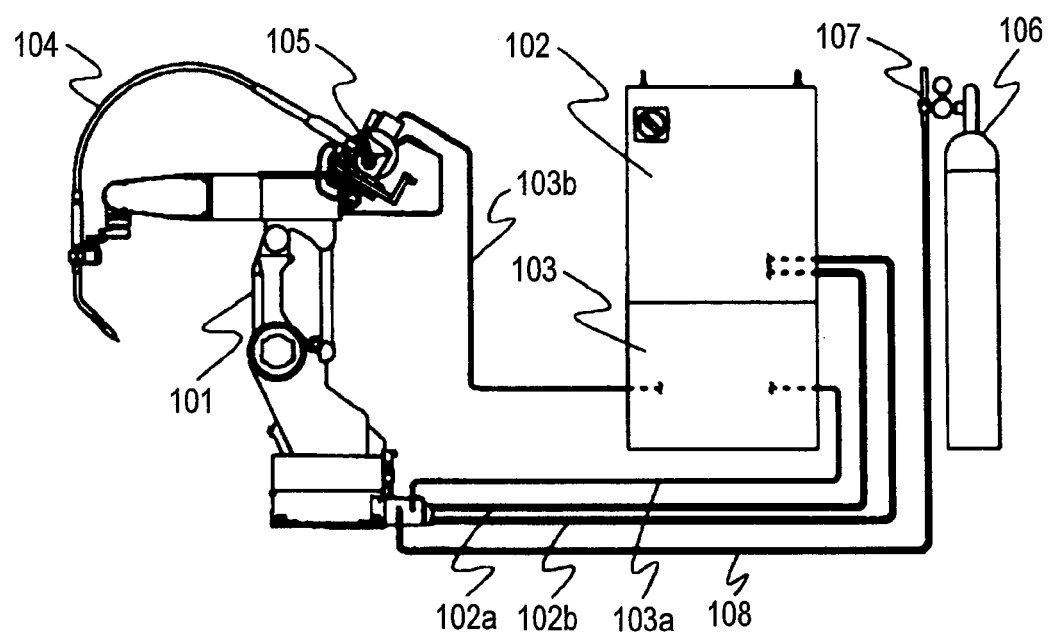
FIG. 3 shows a general configuration of a related art arc welding robot.
Figure 4:
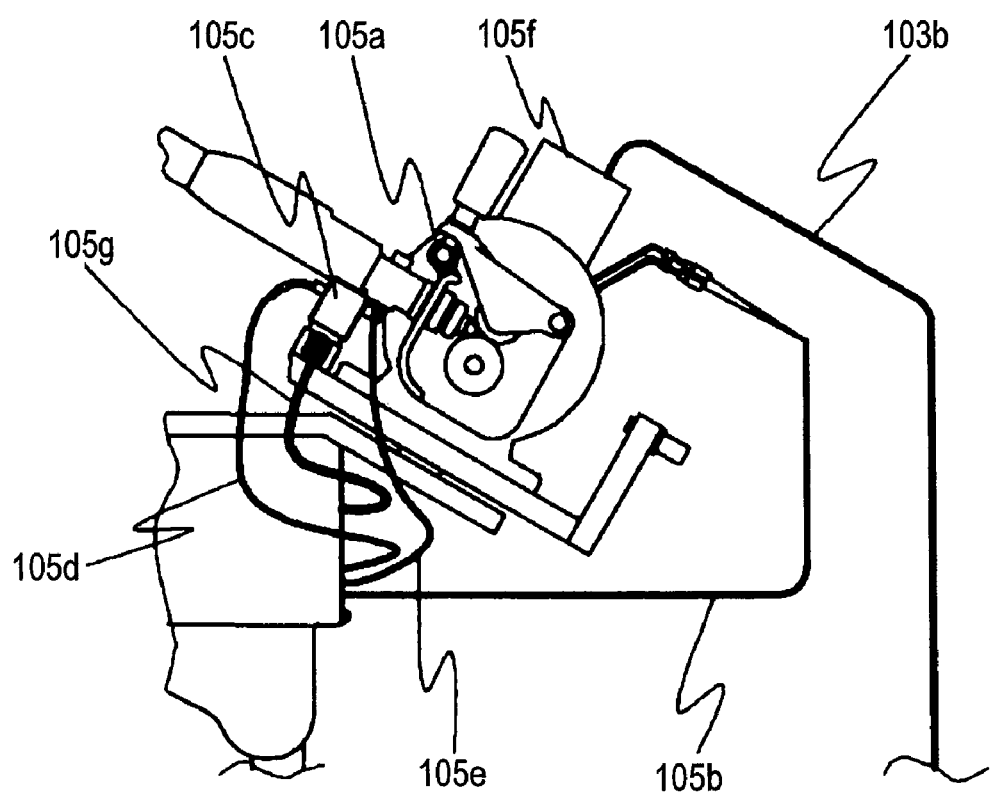
FIG. 4 is an explanatory drawing of the wire feeder of a related art arc welding robot.

FIG. 2 is an explanatory drawing of the vicinity of the wire feeder 5. In FIG. 2, a numeral 5a represents a wire feeder motor, 5b a wire feeder encoder, 5c a gas valve, 5d a gas hose, 5e a wire feeder driving power cable, 5f a gas valve control cable, and 5g a voltage feedback cable.

The robot main body 1 is equipped with the welding torch 4 and the wire feeder 5.

Gas required for welding is supplied from the gas bomb 8 to the welding torch 4 via the gas flow regulator 7, the gas hose 6, a hose (not shown) in the robot main body 1 as well as the gas hose 5d and the gas valve 5c.

The welding power supply 3 is connected to the wire feeder encoder 5b via a feeder sensor cable 3b in order to perform feed speed monitoring thus stabilizing the wire feed amount.

The wire feeder driving power cable 5e of the wire feeder motor 5a, the gas valve control cable 5f of the gas valve 5c, and the voltage feedback cable 5g are connected to the welding power supply 3.

The robot controller 2 is connected to the robot driving power cable 2a for driving the robot main body 1 and the robot control cable 2b for position control. The robot controller 2 is also connected to the welding power supply 3 therein.

In the robot main body driving power cable 2a are accommodated the wire feeder driving power cable 5e, the gas valve control cable 5f, the voltage feedback cable 5g, the feeder sensor cable 3b and the welding control cable.

In installation, the welding torch 4, the wire feeder 5, the gas hose 6 drawn from the gas regulator 7 attached to the gas bomb 8, the robot main body driving power cable 2a and the robot control cable 2b drawn from the robot controller 2 housing the welding power supply 3 are connected to the robot main body 1.

In this way, it is not necessary to separately connect a welding control cable and the wire feeder sensor cable 3b required for welding. This reduces the installation work man-hours on site.

In case the robot main body 1 is mounted on a shift device (not shown), it suffices to extend the robot main body driving power cable 2a, the robot control cable 2b and the gas hose 6 used between the robot main body 1 and the robot controller 2 in the installation work.

In this way, it is possible to reduce the installation work man-hours on site and overall cost without separately extending the welding control cable and the wire feeder sensor cable 3b required for welding.

Figure 1B:
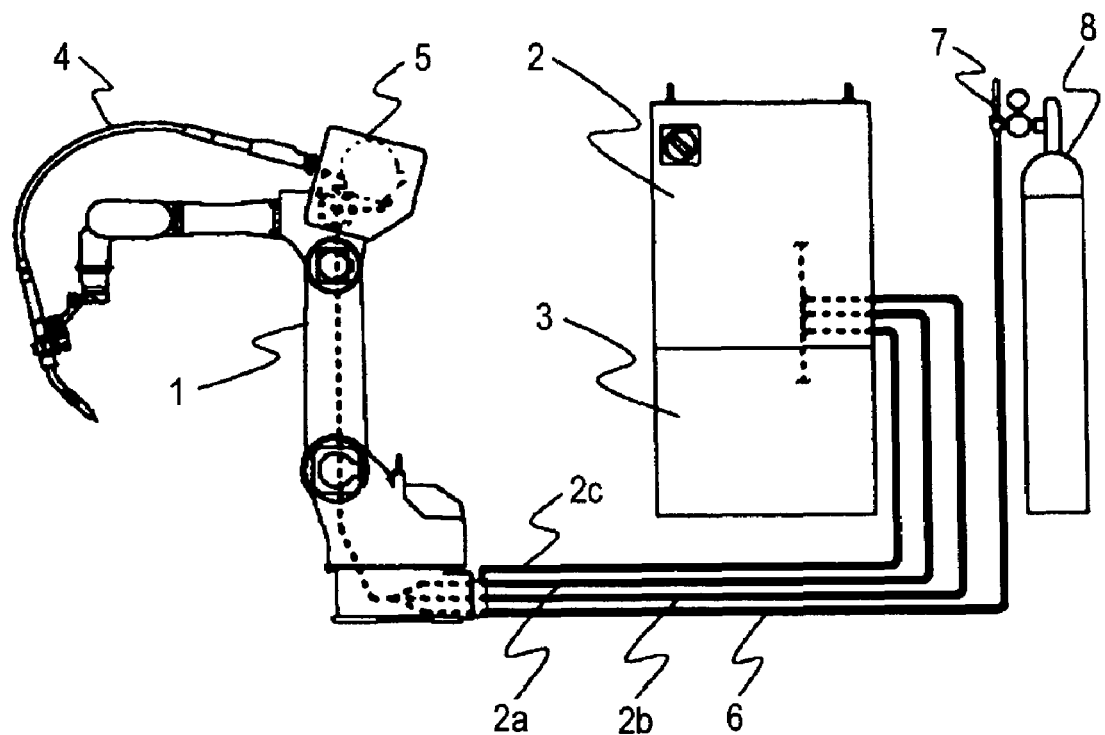
FIG. 1B shows a general configuration of an arc welding robot according to another embodiment of the invention.

As shown in FIG. 1B, it is possible to connect the sensor cable 2c to the robot main body 1 and the robot controller 2 and accommodate the wire feeder sensor cable 3b, the gas valve control cable 5f and the voltage feedback cable 5g in the sensor cable 2c instead of the robot main body driving power cable 2a.

It is also possible to accommodate the sensor cable 2c in the robot main body driving power cable 2a.

It is also possible to accommodate the wire feeder sensor cable 3b, the gas valve control cable 5f and the voltage feedback cable 5g in the robot main body driving power cable 2a and the sensor cable 2c in a dispersed fashion.

While the invention has been described in detail with reference to specific embodiments, those skilled in the art will recognize that various changes and modifications can be made in it without departing from the spirit and scope thereof.

This application is based on Japanese Patent Application No. 2004-184734 filed Jun. 23, 2004 and is incorporated herein by reference.

INDUSTRIAL APPLICABILITY

The arc welding robot according to the invention offers a flexible system that supports small lot multi-production required by diversified customer needs as well as reduces installation work man-hours on site and overall cost, which is effective in terms of industrial applicability.

The invention claimed is:

1. An arc welding robot comprising:
a robot main body including a welding torch and a wire feeder for feeding welding wire to said welding torch, said wire feeder including a sensor and a driving motor;
a robot controller for controlling said robot main body; and
a welding power supply arranged inside said robot controller, said welding power supply controlling said wire feeder and a welding power,
wherein a robot main body driving power cable and a robot control cable are connected between said robot controller and said robot main body and
wherein a sensor cable of said wire feeder, a gas valve control cable for a shield gas supplied to said welding torch and a welding voltage feedback cable are accommodated in said robot main body driving power cable.

2. An arc welding robot comprising:
a robot main body including a welding torch and a wire feeder for feeding welding wire to said welding torch, said wire feeder including a sensor and a driving motor;
a robot controller for controlling said robot main body; and
a welding power supply arranged inside said robot controller, said welding power supply controlling said wire feeder and a welding power,
wherein a robot main body driving power cable, a robot control cable and a sensor cable are connected between said robot controller and said robot main body,
wherein a sensor cable of said wire feeder, a gas valve control cable for a shield gas supplied to said welding torch and a welding voltage feedback cable are accommodated in the sensor cable connected between the robot controller and the robot main body, and
wherein said sensor cable is accommodated in said robot main body driving power cable.

3. An arc welding robot comprising:
a robot main body including a welding torch and a wire feeder for feeding welding wire to said welding torch, said wire feeder including a sensor and a driving motor;
a robot controller for controlling said robot main body; and
a welding power supply arranged inside said robot controller, said welding power supply controlling said wire feeder and a welding power, wherein a robot main body driving power cable, a robot control cable and a sensor cable are connected between said robot controller and said robot main body and wherein a sensor cable of said wire feeder, a gas valve control cable for a shield gas supplied to said welding torch and a welding voltage feedback cable are accommodated in said robot main body driving power cable and in said sensor cable in a dispersed fashion.

\* \* \* \* \*